United States Patent
Deemer

(10) Patent No.: US 6,860,364 B1
(45) Date of Patent: Mar. 1, 2005

(54) CART AND LADDER COMBINATION

(76) Inventor: John B. Deemer, 28 S. Ninth St., Akron, PA (US) 17501

(*) Notice: Subject to any disclaimer, the term of this patent is extended or adjusted under 35 U.S.C. 154(b) by 0 days.

(21) Appl. No.: 10/351,652

(22) Filed: Jan. 28, 2003

(51) Int. Cl.[7] .............................................. A01M 31/00
(52) U.S. Cl. ........................................ 182/20; 182/116
(58) Field of Search ............................ 182/20, 22, 151, 182/116, 187

(56) References Cited

U.S. PATENT DOCUMENTS

| | | | |
|---|---|---|---|
| 3,289,787 A | * 12/1966 | McSwain | ...................... 182/20 |
| 3,476,211 A | * 11/1969 | Cormier | ...................... 182/22 |
| 4,086,980 A | * 5/1978 | Shortes et al. | ............... 182/151 |
| 5,242,030 A | 9/1993 | Lobozzo | |
| 5,295,556 A | 3/1994 | Mullin | |
| 5,433,291 A | 7/1995 | Shoestock, Sr. | |
| 6,186,271 B1 | * 2/2001 | Borries et al. | ................. 182/20 |

* cited by examiner

Primary Examiner—Alvin Chin-Shue

(57) ABSTRACT

A cart and ladder combination includes a plurality of bars such that a first bar and a second bar are defined. A first coupler is adapted for releasably coupling the first and second bars together in a spaced relationship to each other. A second coupler is adapted for releasably coupling the first and second bars together in a spaced relationship to each other. A wheel assembly is removably attached to the first ends of the first and second bars. A cord member is selectively strung between the first and second bars. The second end of the first bar may be selectively attached to the first end of the second bar to form a ladder.

20 Claims, 4 Drawing Sheets

CART AND LADDER COMBINATION

BACKGROUND OF THE INVENTION

1. Field of the Invention

The present invention relates to cart devices and more particularly pertains to a new cart device that would make it easier to transport a game animal out of a remote location after a successful hunt.

2. Description of the Prior Art

The use of cart devices is known in the prior art. U.S. Pat. No. 5,242,030 describes a deer stand for use as an elevated observation platform and a game carrier. Another type of cart device is U.S. Pat. No. 5,433,291 describes a combination tree stand and wheeled game carrier that provides carriage of a user's equipment into a relatively remote hunting spot. U.S. Pat. No. 5,295,556 describes a multipurpose hunting cart that is convertible between a wheeled cart and a stand.

SUMMARY OF THE INVENTION

The object of the present invention is to provide a new cart device that would provide a hunter with a wheeled cart that would allow the hunter to load his stand and other equipment onto the cart and pull it along as he walks to a remote location. The present invention also converts into a ladder for climbing into or out of a tree stand to reduce the risk of injury to a hunter. Also, since the device may be converted from a ladder to a cart, the hunter need only bring one item into the hunting area instead of two items.

To this end, the present invention generally comprises a plurality of bars such that a first bar and a second bar are defined. A first coupler is adapted for releasably coupling the first and second bars together in a spaced relationship to each other. A second coupler is adapted for releasably coupling the first and second bars together in a spaced relationship to each other. A wheel assembly is removably attached to the first ends of the first and second bars. A cord member is selectively strung between the first and second bars. The second end of the first bar may be selectively attached to the first end of the second bar to form a ladder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
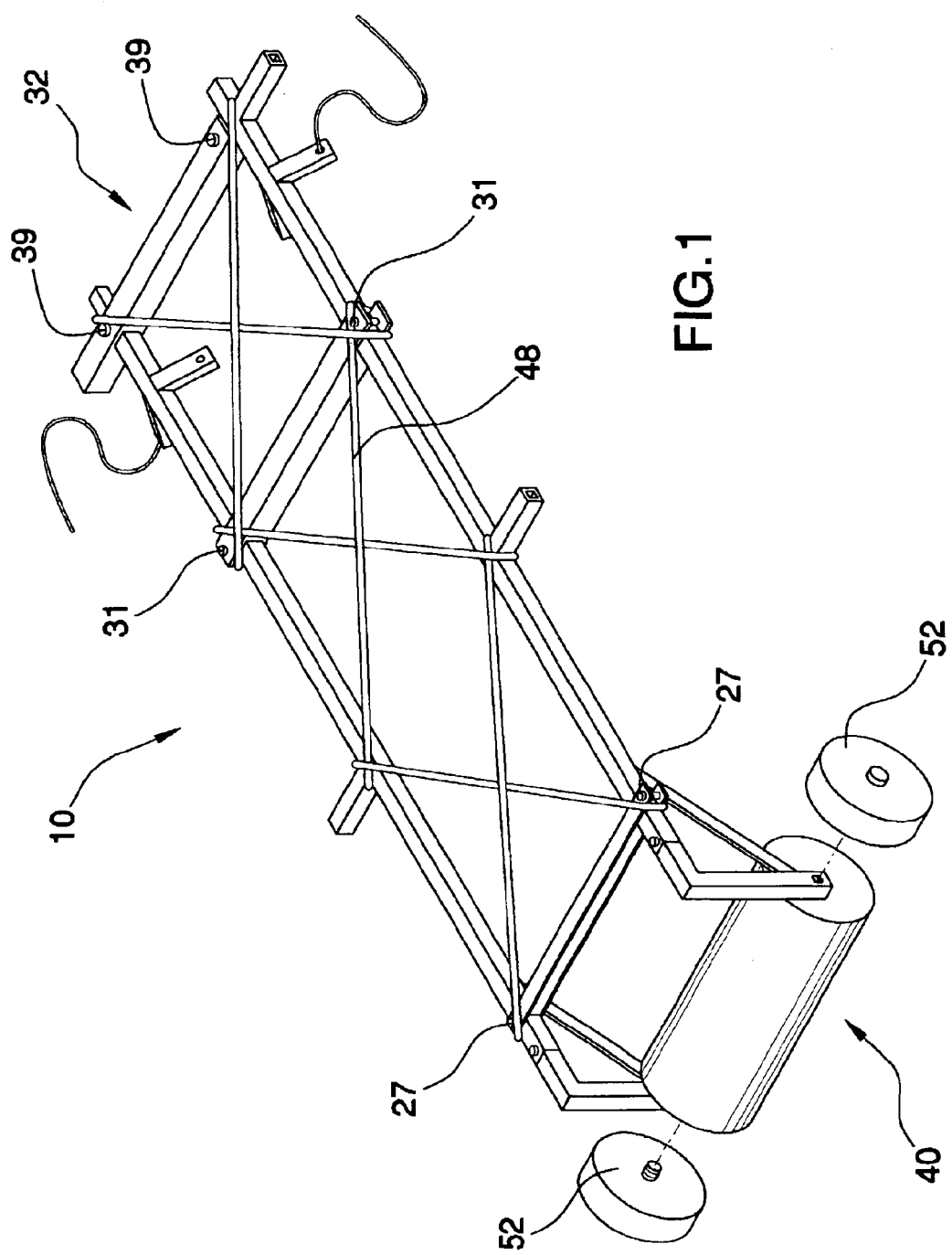
FIG. 1 is a perspective view of a cart and ladder combination according to the present invention.
Figure 2:
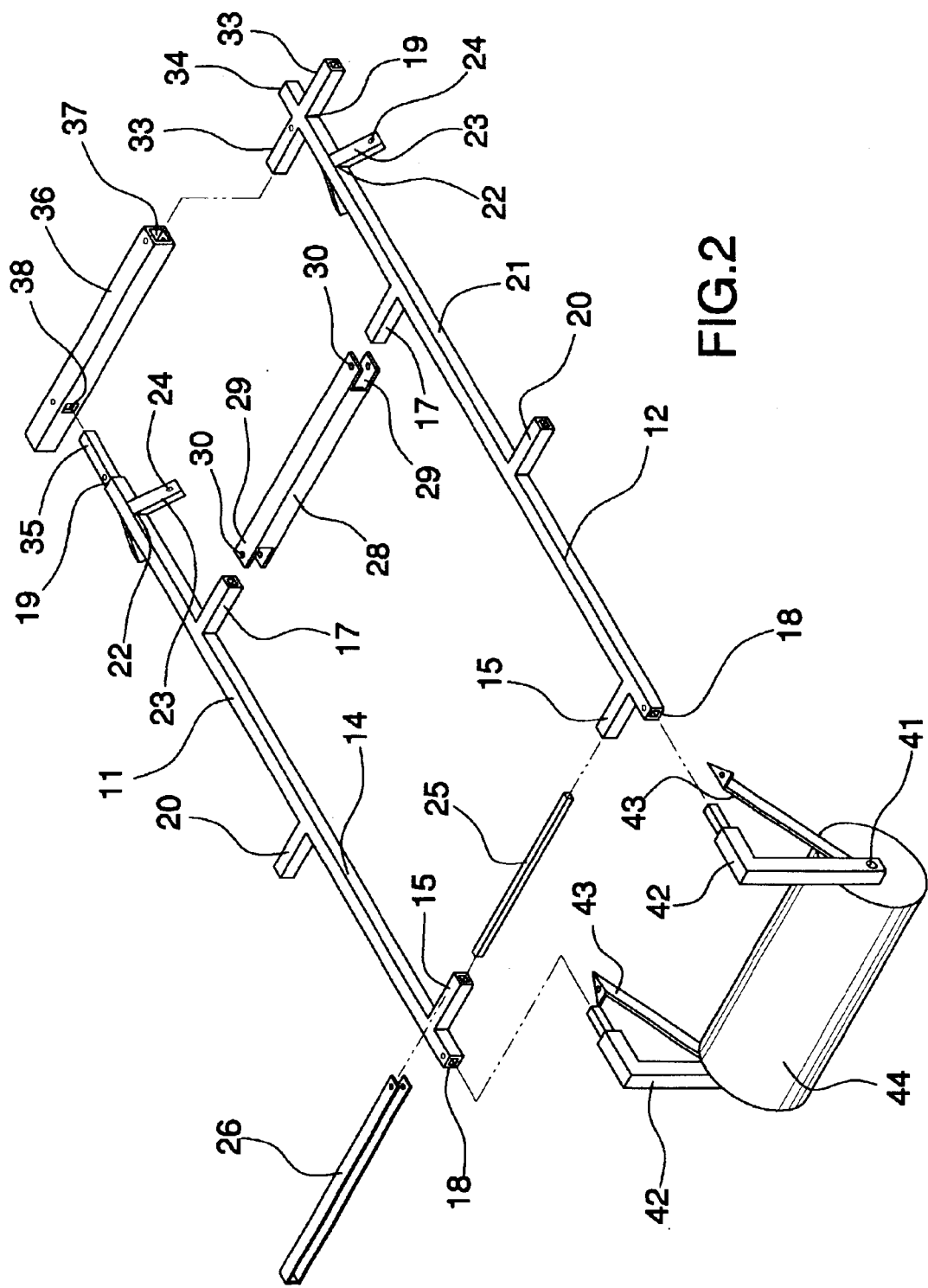
FIG. 2 is an expanded view of the present invention.
Figure 3:
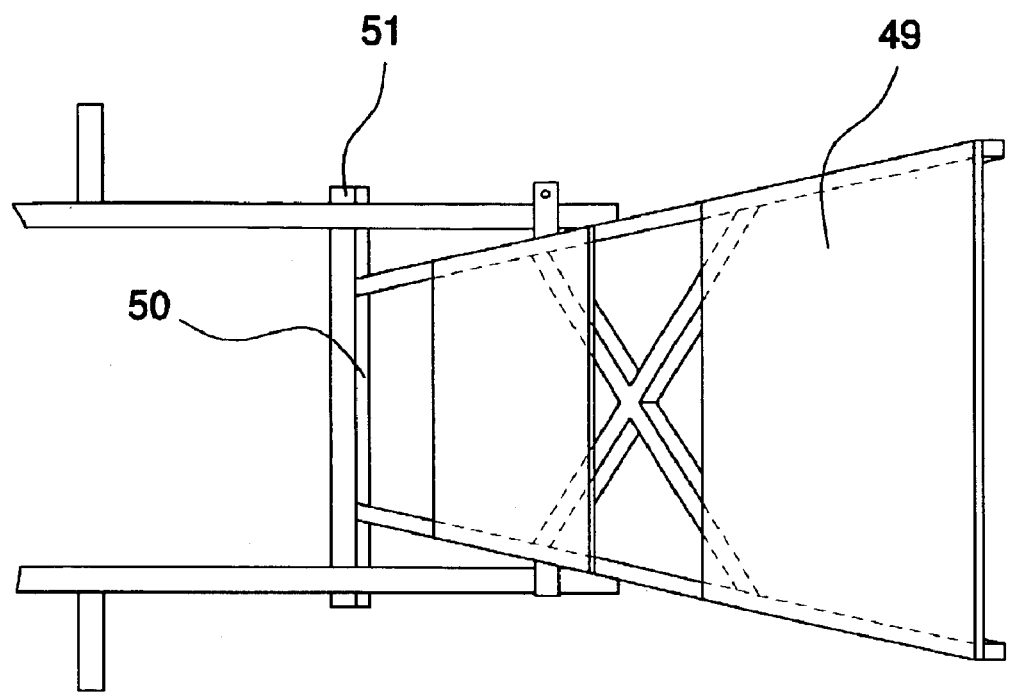
FIG. 3 is a perspective view of the present invention.

With reference now to the drawings, and in particular to FIGS. 1 through 5 thereof, a new cart device embodying the principles and concepts of the present invention and generally designated by the reference numeral 10 will be described.

As best illustrated in FIGS. 1 through 5, the cart and ladder combination 10 generally comprises a device which can function as a cart for the removal of game, such as deer, from a hunting area and may be taken apart so that the device may function as a ladder for climbing a tree.

The device comprises a plurality of bars that preferably include a first bar 11, a second bar 12 and a third bar 13. Each of the bars has a first end and a second end. Preferably, each of the first ends is open. The first 11 and second 12 bars each have an inside surface 14 and an outside surface 15 with respect to each other when they are positioned in parallel alignment. Each of the first 11 and second 12 bars includes a pair of inner rods that is attached to the inside surface 14 and extends away from the inside surface 14. The inner rods are spaced from each other. A first of the inner rods 15 on each of the first 15 and second bars 11, 12 comprises a female coupler. A second of the inner rods 17 on each of the first 11 and second 12 bars comprises a male coupler. The first inner rods 15 are positioned nearer the first ends 18 than the second ends 19 of the first 11 and second 12 bars and the second inner rods 17 are positioned nearer the second ends 19. Ideally, one of a pair of outer rods 20 is attached to the outer surface 21 and extends away therefrom. The outer rods 20 are positioned generally between an associated pair of inner rods 15,17.

A support 22 is preferably attached to each of the first 11 and second 12 bars and is positioned generally adjacent to the second ends 19 of the first 11 and second 12 bars. Each of the supports 22 includes a V-shaped member having two legs 23. A hole 24 extends through each of the legs 23. A support 22 may also be attached to the third bar 13.

A first coupler 25 is adapted for releasably coupling the first 11 and second 12 bars together in a spaced relationship to each other. The first coupler 25 includes a pole that is extendable into and between the first inner rods 15. A bracket 26 may be positioned over the first coupler 25 to assist in holding the first 11 and second 12 bars together and is held in place with a pin 27.

A second coupler 28 is adapted for releasably coupling the first 11 and second 12 bars together in a spaced relationship to each other. The second coupler 28 includes a tubular member having a pair of open ends for receiving the second inner rods 17. A pair of spaced plates 29 is attached to each end of the tubular member such that the first 11 and second 12 bars are positioned between a pair of plates 29 when the second inner rods 17 are positioned in the tubular member. Each of the pair of plates 29 has aligned apertures 30 therein such that a pin 31 may be removably extended through an aligned pair of apertures 30 for securing the tubular member to the pair of bars 11, 12.

A third coupler 32 is adapted for releasably coupling the first 11 and second 12 bars together in a spaced relationship to each other and also functions as a handle. The third coupler 32 includes a pair of side protruding members 33 and an end member 34 that is attached to the second end 19 of the second bar 12 such that a T-bar is defined. The side protruding members 33 generally lie in a same plane as the inner rods 15, 17 of the second bar 12. A male protruding member 35 is attached to and extends away from the second end 19 of the first bar 11. An elongated handle 36 has a receiving end 37 for receiving one of the side protruding members 33 and an opening 38 extending therethrough for receiving the male protruding member 35. A plurality of pins 39 is extendable into the elongated handle 36 and into the male protruding member 35 and a connected or associated one of the side protruding members 33.

A wheel assembly 40 is removably attached to the first ends 18 of the first 11 and second 12 bars. The wheel assembly 40 includes an axle 41 having a pair of mounts 42 attached thereto. Each of the mounts 42 is removably extendable into one of the first ends 18 of the first 11 and second 12 bars. The mounts 42 are preferably L-shaped so that a greater space is maintained between the first 11 and second 12 bars and a ground surface. Also, by using a L-shaped mount, the center of gravity is moved closer to a point vertically above wheel assembly 40, which enhances the movement of the cart. A pair of braces 43 is attached to the axle 41. Each of the braces 43 extends between the axle 41 and one of the first 11 and second 12 bars. The braces 43 are releasably attached to the adjacent one of the first 11 and second 12 bars. A wheel 44 is mounted on the axle 41. Additional wheels 52 may be added on the ends of the axle 44 for providing greater stability when the cart is supporting a load.

A foot member 45 is preferably attached to the first end 46 of the third bar 13. A plurality of rods 47 is attached to the third bar 13. The foot member 45 acts as a stabilizer when the third bar 13 is used as the bottom portion of a ladder while the rods 47, both on the third bar 13 and the inner 15, 17 and outer rods 20 on the first 11 and second 12 bars, act as steps when the bars 11, 12, 13 are formed into a ladder.

Figure 5:
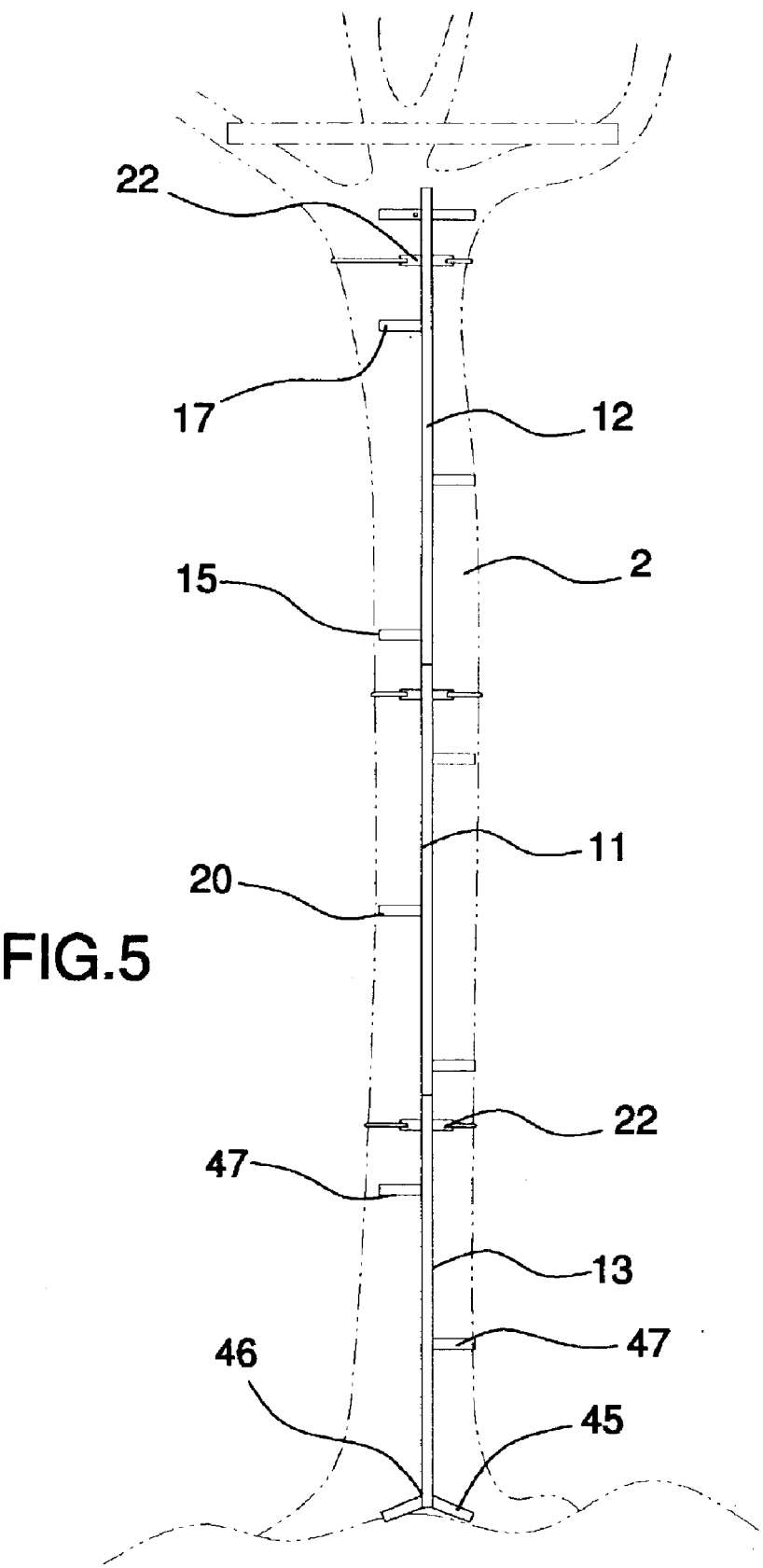
FIG. 5 is a front view of the present invention.

A cord member 48 is selectively strung between the first 11 and second 12 bars. The cord 48, when the first 11 and second 12 bars are positioned in the shape of a cart, is wound about the first 11 and second 12 bars as depicted in FIG. 1. This provides a plane on which game may be placed. When the bars 11, 12, 13 are placed in the ladder configuration as shown in FIG. 5, the cord 48 may be extended through the holes 24 in the supports 22 and wrapped around a tree 2 to secured the bars in place.

Figure 4:
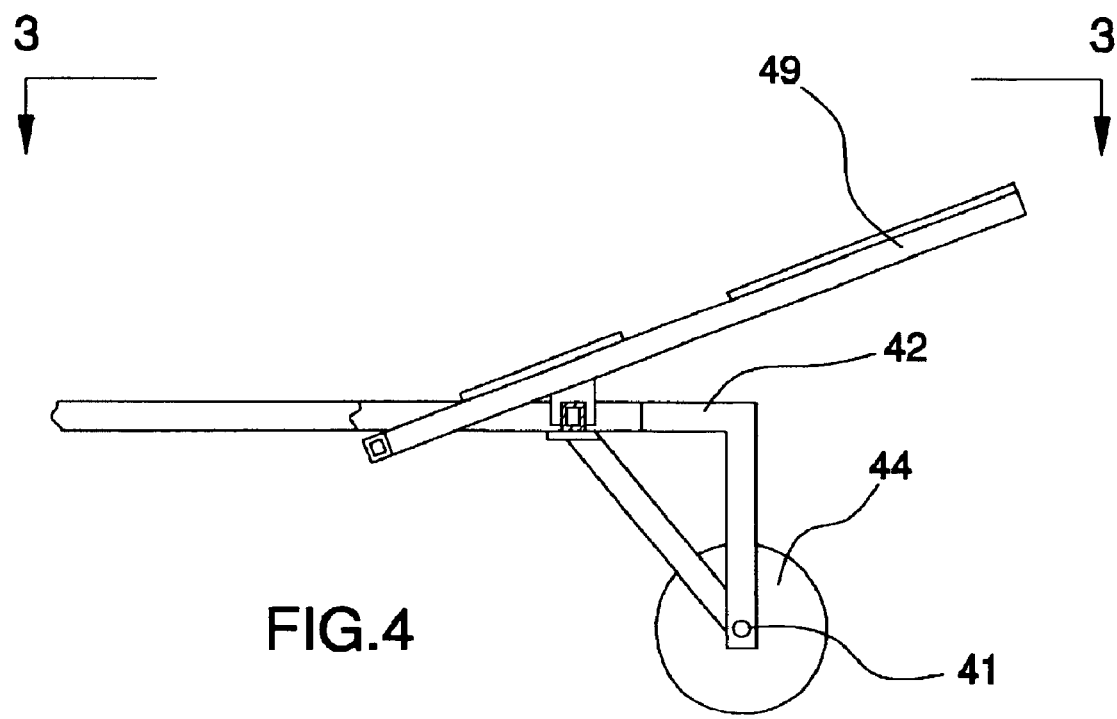
FIG. 4 is a side view of the present invention.

In use, the cart is used as a conventional cart to move loads where needed. The cart may include an optional panel 49, which has a generally rectangular configuration having a width less than the width between the spaced first 11 and second 12 bars. An end of the panel 50 has extension members 51 extending outward in either direction so that they may be abutted to a bottom surface of the first 11 and second 12 bars while the panel 49 rests on an upper surface of the first coupler 25. This allows the panel 49 to be positioned in an angular relationship with respect to the first 11 and second 12 bars as shown in FIG. 4.

To use the device as a ladder, the second end 19 of the first bar 11 is attached to the first end 18 of the second bar 12 and the second end 19 of the third bar 13 is attached to the first end 18 of the first bar 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cart and ladder combination device, said device comprising:
    a plurality of bars including a first bar and a second bar, each of said bars having a first end and a second end, each of said first and second bars have an inside surface and an outside surface with respect to each other when said bars are positioned in parallel alignment, a pair of inner rods being attached to said inside surface of each of said first and second bars and extending away therefrom, said inner rods being spaced from each other;
    a first coupler being adapted for releasably coupling said first and second bars together in a spaced relationship to each other;
    a second coupler being adapted for releasably coupling said first and second bars together in a spaced relationship to each other, said second coupler includes a tubular member having a pair of open ends for receiving said second inner rods;
    a pair of spaced plates being attached to each end of said tubular member such that said first and second bars are positioned between said pair of plates when said second inner rods are positioned in said tubular member, each of said pair of plates having aligned apertures therein such that a pin may be removably extended through an aligned pair of apertures for securing said tubular member to said pair of bars
    a wheel assembly being removably attached to said first ends of said first and second bars;
    a cord member being selectively strung between said first and second bars; and
    wherein said second end of said first bar may be selectively attached to said first end of said second bar to form a ladder.

2. The cart and ladder combination device of claim 1, wherein said plurality of bars further includes a third bar, said second end of said third bar being releasably attachable to said first end of said first bar for extending an effective height of said ladder.

3. The cart and ladder combination device of claim 1, wherein a first of said inner rods comprises a female coupler and a second of said inner rods comprises a male coupler, said first coupler including a pole being extendable into and between said first inner rods.

4. The cart and ladder combination device of claim 1, further including each of said first and second bars including an outer rod being attached to said outer surface and extending away therefrom, each of said outer rods being positioned generally between a respective pair of said inner rods.

5. The cart and ladder combination device of claim 1, each one of a pair of supports being attached to one of said first and second bars.

6. The cart and ladder combination device of claim 1, further including a third coupler being adapted for releasably coupling said first and second bars together in a spaced relationship to each other, said third coupler being positionable adjacent said second end of said first and second bars.

7. The cart and ladder combination device of claim 6, wherein said third coupler includes:
   a pair of side protruding members and an end member being attached to said second end of said second bar such that a T-bar is defined;
   a male protruding member being attached to and extending away from said second end of said first bar; and
   an elongated handle having a receiving end for receiving one of said side protruding members and an opening extending therethrough for receiving said male protruding member.

8. The cart and ladder combination device of claim 7, further including a plurality of pins being extendable into said elongated handle and into said male protruding member and an associated one of said side protruding member.

9. The cart and ladder combination device of claim 2, further including a foot member being attached to said first end of said third bar.

10. The cart and ladder combination device of claim 2, further including a plurality of rods being attached to said third bar.

11. A cart and ladder combination device, said device comprising:
   a plurality of bars such that a first bar, a second bar and a third bar are defined, each of said bars having a first end and a second end, each of said first ends being open, each of said first and second bars having an inside surface and an outside surface with respect to each other when said bars are positioned in parallel alignment, each of said first and second bars including;
      a pair of inner rods being attached to said inside surface and extending away therefrom, said inner rods being spaced from each other, a first of said inner rods comprising a female coupler, a second of said inner rods comprising a male coupler;
      an outer rod being attached to said outer surface and extending away therefrom, said outer rod being positioned generally between said inner rods;
   a pair of supports, each of said supports being attached to one of said first and second bars, said supports being positioned generally adjacent to said second ends of said first and second bars;
   a first coupler being adapted for releasably coupling said first and second bars together in a spaced relationship to each other, said first coupler including a pole being extendable into and between said first inner rods;
   a second coupler being adapted for releasably coupling said first and second bars together in a spaced relationship to each other, said second coupler including a tubular member having a pair of open ends for receiving said second inner rods, a pair of spaced plates being attached to each end of said tubular member such that said first and second bars are positioned between a pair of plates when said second inner rods are positioned in said tubular member, each of said pair of plates having aligned apertures therein such that a pin may be removably extended through an aligned pair of apertures for securing said tubular member to said pair of bars;
   a third coupler being adapted for releasably coupling said first and second bars together in a spaced relationship to each other, said third coupler including;
      a pair of side protruding members and an end member being attached to said second end of said second bar such that a T-bar is defined, said side protruding members generally lying in a same plane as said inner rods of said second bar;
      a male protruding member being attached to and extending away from said second end of said first bar;
      an elongated handle having a receiving end for receiving one of said side protruding members and an opening extending therethrough for receiving said male protruding member;
      a plurality of pins being extendable into said elongated handle and into said male protruding member and an associated one of said side protruding member;
   a wheel assembly being removably attached to said first ends of said first and second bars, said wheel assembly including an axle having a pair of mounts attached thereto, each of said mounts being removably extendable into one of said first ends of said first and second bars, a pair of braces being attached to said axle, each of said braces extending between said axle and one of said first and second bars, a wheel being mounted on said axle;
   a foot member being attached to said first end of said third bar, a plurality of rods being attached to said third bar;
   a cord member being selectively strung between said first and second bars; and wherein said second end of said first bar may be selectively attached to said first end of said second bar and said second end of said third bar may be selectively attached to said first end of said first bar to form a ladder.

12. A cart and ladder combination device, said device comprising:
   a plurality of bars such that a first bar and a second bar are defined, each of said bars having a first end and a second end;
   a first coupler being adapted for releasably coupling said first and second bars together in a spaced relationship to each other;
   a second coupler being adapted for releasably coupling said first and second bars together in a spaced relationship to each other;
   a third coupler being adapted for releasably coupling said first and second bars together in a spaced relationship to each other, said third coupler being positionable adjacent said second end of said first and second bars, said third coupler including;
      a pair of side protruding members and an end member being attached to said second end of said second bar such that a T-bar is defined;

a male protruding member being attached to and extending away from said second end of said first bar;

an elongated handle having a receiving end for receiving one of said side protruding members and an opening extending therethrough for receiving said male protruding member;

a wheel assembly being removably attached to said first ends of said first and second bars;

a cord member being selectively strung between said first and second bars; and wherein said second end of said first bar may be selectively attached to said first end of said second bar to form a ladder.

13. The cart and ladder combination device of claim 12, wherein said plurality of bars further includes a third bar, said second end of said third bar being releasably attachable to said first end of said first bar for extending an effective height of said ladder.

14. The cart and ladder combination device of claim 12, wherein each of said first and second bars have an inside surface and an outside surface with respect to each other when said bars are positioned in parallel alignment, a pair of inner rods being attached to said inside surface of each of said first and second bars and extending away therefrom, said inner rods being spaced from each other.

15. The cart and ladder combination device of claim 14, wherein a first of said inner rods comprises a female coupler and a second of said inner rods comprises a male coupler, said first coupler including a pole being extendable into and between said first inner rods.

16. The cart and ladder combination device of claim 14, further including each of said first and second bars including an outer rod being attached to said outer surface and extending away therefrom, each of said outer rods being positioned generally between a respective pair of said inner rods.

17. The cart and ladder combination device of claim 14, each one of a pair of supports being attached to one of said first and second bars.

18. The cart and ladder combination device of claim 12, further including a plurality of pins being extendable into said elongated handle and into said male protruding member and an associated one of said side protruding member.

19. The cart and ladder combination device of claim 13, further including a foot member being attached to said first end of said third bar.

20. The cart and ladder combination device of claim 13, further including a plurality of rods being attached to said third bar.

* * * * *